United States Patent [19]

Shiraishi et al.

[11] 4,339,861
[45] Jul. 20, 1982

[54] CONTINUOUS WORKING PROCESS OF STEEL BARS FOR REINFORCED CONCRETE AND APPARATUS THEREFOR

[75] Inventors: Hiroshi Shiraishi, Mitaka; Shigeru Moriguchi, Chiba, both of Japan

[73] Assignees: Kajima Corporation; Mitsui Engineering and Shipbuilding Co., both of Tokyo, Japan

[21] Appl. No.: 133,105

[22] Filed: Mar. 24, 1980

[30] Foreign Application Priority Data

Mar. 23, 1979 [JP] Japan .................................. 54-33946

[51] Int. Cl.³ .............................................. B23P 17/00
[52] U.S. Cl. ...................................................... 29/416
[58] Field of Search ................................... 29/416, 417

[56] References Cited

U.S. PATENT DOCUMENTS 2,327,103  8/1943  Gude .................................. 29/417 X
2,588,439  3/1952  Ward .................................. 29/417 X
2,959,849 11/1960  Rubin ..................................... 29/417
4,207,667  6/1980  D'Angelo et al. ..................... 29/417

FOREIGN PATENT DOCUMENTS

1283006 12/1961  France .................................. 29/417

Primary Examiner—James G. Smith
Attorney, Agent, or Firm—Armstrong, Nikaido, Marmelstein & Kubovcik

[57] ABSTRACT

Disclosed herein is a continuous working process of steel bars for reinforced concrete comprising: feeding an endless steel bar material to a cutter while intermittently controlling the advance of said material in a predetermined distance and the stop thereof; cutting said endless steel bar so fed by said cutter into steel bars having a predetermined length; and banding together the steel bars so cut in a plural, predetermined number. An apparatus for practicing said process is also disclosed.

8 Claims, 7 Drawing Figures

CONTINUOUS WORKING PROCESS OF STEEL BARS FOR REINFORCED CONCRETE AND APPARATUS THEREFOR

BACKGROUND OF THE INVENTION

This invention relates to a continuous working process of steel bars for reinforced concrete and apparatus therefor. More specifically, the present invention relates to a process and apparatus which make possible automatic working of steel bars, saving the time required for the work and reducing the material losses.

The working of the steel bars for reinforced concrete has generally been carried out while a worker cuts and bends the steel bars one by one in accordance with a model or with a working drawing, using a simple cutter and bending machine that are provided near the site of the reinforced concrete working. Since this work must be made manually by the worker using a measure or a protractor, the efficiency of work is extremely low and the work itself is extremely complicated. The material used for the work is a steel bar having generally a length of 5 m to 10 m. If the material is cut in a desired length, therefore, large and small chips are unavoidably produced and the waste of the material is not negligible.

Generally, such steps of the worked bars as classification, banding and arrangement are made at the final stage after the working of the steel bars is completed. This places a serious obstacle to the automation of the work and requires an extended period of working time. As the most of the work depends on the manual work, deviation of the accuracy of finishing is greatly depending on the skill of the individual worker, thus making the work extremely inefficient.

SUMMARY OF THE INVENTION

It is therefore an object of the present invention to provide a continuous working process of steel bars for reinforced concrete and apparatus therefor which solve the abovementioned problems with the prior art.

It is another object of the present invention to provide a continuous working process of steel bars for reinforced concrete and apparatus therefor which facilitate the automation of the work.

It is still another object of the present invention to provide a continuous working process of steel bars for reinforced concrete and apparatus therefor which make it possible to effectively use the material without producing large and small chips.

It is still another object of the present invention to provide a continuous working process of steel bars for reinforced concrete and apparatus therefor which make it possible to drastically reduce the time required for the work.

It is further an object of the present invention to provide a continuous working process of steel bars for reinforced concrete which has a high accuracy of finishing and high efficiency, as well.

In order to accomplish the abovementioned objects, the present invention provides a continuous working process of steel bars for reinforced concrete comprising feeding an endless steel bar material to a cutter by intermittently controlling the advance of said material in a predetermined distance and the stop thereof; cutting the endless steel bar material thus fed by said cutter into steel bars having a predetermined length; and banding together the steel bars thus cut in a plural, predetermined number.

In order to accomplish the abovementioned objects, the present invention also provides an apparatus for the continuous working of steel bars for reinforced concrete, comprising feed means for feeding an endless steel bar material; a cutter for cutting said endless steel bar material in a predetermined length; means for feeding said endless steel bar material in a predetermined length and stopping it with respect to said cutter; bundling means for bundling together plural steel bars thus cut; and banding means for banding together said plural steel bars thus bundled.

The above and other objects as well as advantageous features of the invention will become clear from the following description of preferred embodiments taken in conjunction with the accompanying drawings.

DESCRIPTION OF THE PREFERRED EMBODIMENTS

Figure 1:
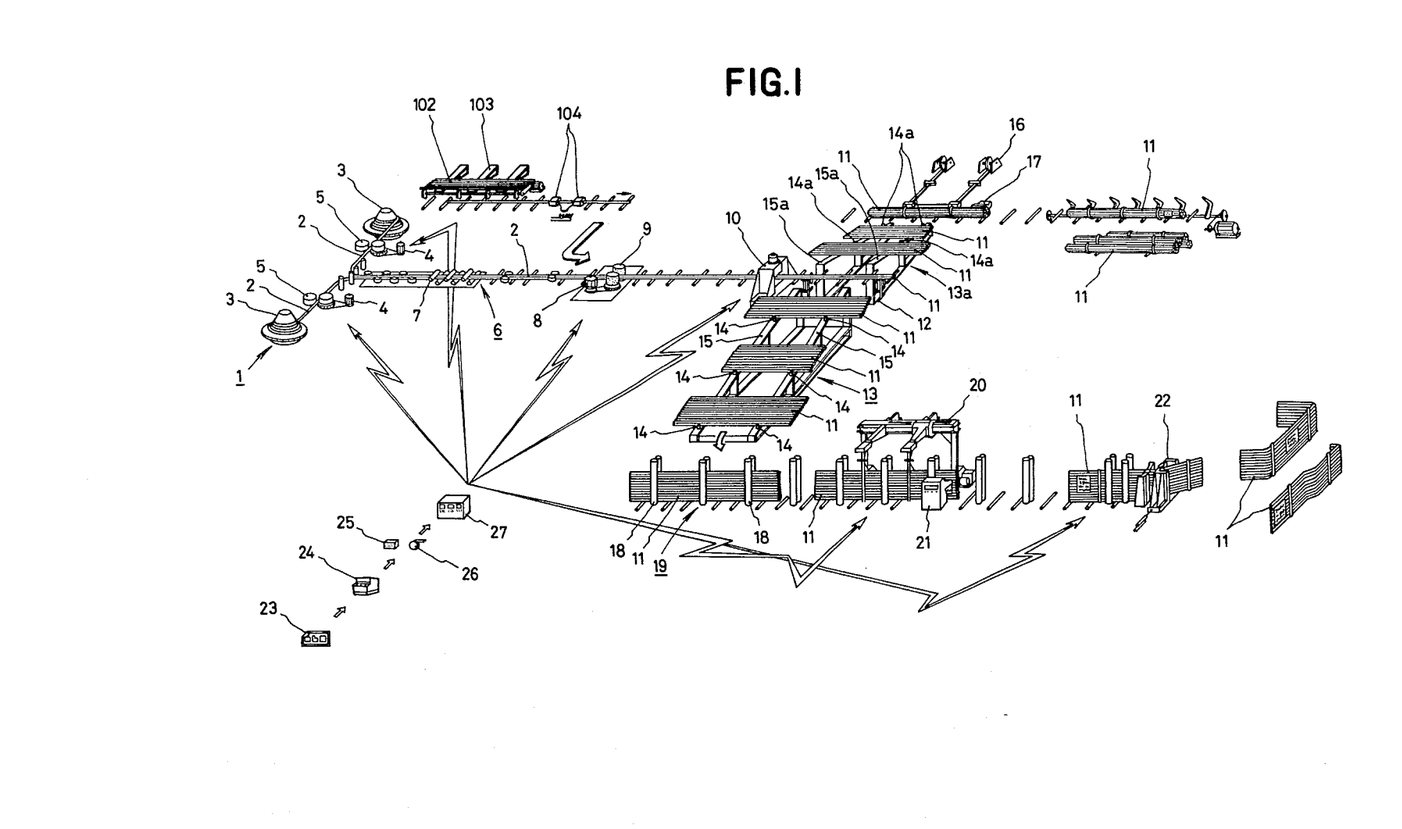
FIG. 1 is a flow sheet for practising the process in accordance with the present invention.

In FIG. 1, reference numeral 1 represents a material feed means which comprises magazine reels 3 incorporating therein the material of the steel bar wound in the coiled form and a pair of withdrawing rollers 5, 5 actuated by a motor 4. The magazine reels 3 are disposed on the right and left and the steel bar material 2 are withdrawn by the withdrawing rollers 5 while being uncoiled. The two steel bar material 2 thus withdrawn are aligned with each other and then supplied to a continuous straightening section 6.

This continuous straightening section 6 consists of a plurality of levelling roller mechanisms 7 arranged in the zigzag manner and correct the steel bar material 2 that have curved portions and are withdrawn from the respective magazine reels 3.

On the downstream side of the continuous staightening section 6 are disposed a pair of feed rollers 9, 9 actuated by a motor 8 which rotates and stops intermittently. These feed rollers 9, 9 feed to a cutter 10 the steel bar material 2 that are straightened. The cutter 10 cuts the steel bar material into steel bars 11 having a predetermined length. The predetermined cutting length of the steel bar 11 is determined by the number of revolution of the feed rollers 9, 9. In other words, the pair of the feed rollers 9, 9 rotate at the speed corresponding to the desired cutting length so that after the endless steel bar material 2 are fed, the feed rollers 9, 9 stop rotating and the cutter 10 is actuated to cut the endless steel bar material 2 into the steel bars 11 of a predetermined length during the stop of the feed rollers 9, 9.

A sorter 12 is disposed at the back of the cutter 10 and stockers 13, 13a are disposed on both right and left sides of this sorter 12. Slopes 15, 15a are defined on the upper surfaces of the stockers 13, 13a, respectively, so as to downwardly incline from the cutting position of the cutter 10 and stoppers 14, 14a are retractively disposed on the slopes 15, 15a with a suitable gap between them. The sorter 12 sorts out those cut steel bars 11 which require bending work towards the stocker 13 and those which do not and hence, can be used as straight bars, towards the stocker 13a, respectively. The steel bars 11 thus stored into the respective stockers 13, 13a fall while rolling down over the slopes 15, 15a and are then locked and gathered in a required number by means of the stoppers 14, 14a. After the required number of steel bars 11 are gathered, the stoppers 14, 14a retract whereby the plural steel bars 11 roll down integrally to the subsequent stoppers 14, 14a of the lower stage where their rolling is locked. After the sequence of these procedures is repeated, the steel bars 11 bundled on the stocker 13a are transferred onto a banding means 16 where they are bundled into a cylindrical form and banded with a wire or a band. Necessary markings such as material, diameter, type and class are applied to the steel bars 11 by a marker 17 whereupon the steel bars are withdrawn for shipment.

On the other hand, the steel bars 11 gathered on the other stocker 13 are arranged in the slat form by a flat arranging machine 19 consisting of plural pairs of rollers 18. The flat arranging machine 19 clamps the plural steel bars 11 in rows between the pairs of rollers 18, 18 and arranges them flatly. The bundle of steel bars 11 thus arranged flatly is as such conveyed to binder means 20 where it is banded with a wire or a band while being flat. The bundle of steel bars 11 banded in this manner is applied by a marker 21 with necessary markings such as material, diameter, type and class. After marking, the banded bundle of the steel bars 11 is then transferred to a bending machine 22, where it is subjected to the bending work into a desired shape and size as it being kept flat.

Though the endless steel bar blank 2 is taken out from the magazine reel 3 in which it is wound in coil, it is also possible to produce the steel bars from straight steel bar material having a specified length. As shown in the upper lefthand portion of FIG. 1, plural steel bar blanks 102 having a specified length are placed on a conveyor 103, from which the steel bar blank 102 is carried out one by one. While each steel bar blank 103 of a specified length is being conveyed in the longitudinal direction, the steel bar material are mutually welded by a welding machine 104 end to end.

A series of the abovementioned working process steps of the steel bars for the reinforced concrete may also be controlled by means of a controller 27 on the basis of the data processed by a computer 24. A work instruction card 25 or tape 26 is prepared by processing the data required for the working of the steel bars 11 by the computer 24 on the basis of a bar arrangement diagram 23, for example, and is then input to the controller 27 so that the controller 27 generates an instruction as indicated by an arrow in the drawing and controls the work process.

Now, the endless steel bar material 2 that are uncoiled from the respective magazine reels 3 and converted into the continuous straight material by the levelling roller mechanisms 7 are supplied to the cutters 10 in such a length that is determined by the feed rollers 9 instructed by the controller 27 and by the withdrawing rollers 5 actuated so as to follow up the feed rollers 9. Along with the movement of the preceeding endless steel bar material, the steel bar material 2 that are yet coiled inside the magazine reels are uncoiled and withdrawn and are converted into the continuous straight bar material by the levelling roller mechanisms 7 while they are being transferred to the cutters 10.

After feeding the steel bar material 2 in the length as instructed to the cutters 10, the feed rollers 9 and the withdrawing rollers 5 stop operating. Upon their stopping, the controller 27 then sends an instruction to the cutters 10 and the cutters 10 in turn cut the steel bar material 2 on the basis of the instruction and form the straight steel bars 11 having a desired length.

The steel bars formed and cut in this manner are placed on the sorter 12. When the steel bars are used, as such, as the straight steel bars, they are sorted onto the stocker 13a on the basis of the instruction from the controller 27. If they are subjected to the bending work, they are assorted onto the stocker 13 also on the basis of the instruction from the controller 27.

The abovementioned procedures are repeated according to the instruction from the controller 27 till the required number of steel bars 11 having a desired length are obtained.

When the required number of the steel bars having the same length are put in order on the stocker 13 or 13a, the controller 27 then generates and transmits an instruction to the feed rollers 9, the withdrawing rollers 5 and to the cutters 10 so as to produce the bars 11 having a different length. When the steel bars 11 produced by the aforementioned cut work are used as the straight bars, the controller 27 sends an instruction to the binding means 16 so as to band the steel bars 11 on the stocker 13a, and further transmits an instruction to the marker 17 to apply the necessary markings to the steel bars 11. The steel bars 11 are thereafter carried out for shipment.

On the other hand, in order to bend-work the abovementioned steel bars 11 produced by cutting, the steel bars 11 are arranged flatly by the flat arranging machine 19 according to the instruction from the controller 27 to the machine, are then sent to the banding means 20 to be banded with a wire or a belt while they are kept flat, and thereafter applied with the necessary markings by the marker 21.

The steel bars 11 arranged flatly in this manner are then forwarded to the bending machine 22 according to the instruction from the controller 27 where they are bent into a desired shape and size while being kept flat, followed by the shipment.

Besides the banding by means of the wire or the band as used in the foregoing embodiments, it is also possible to band the bundle of steel bars 11 by means of welding.

Figure 2:
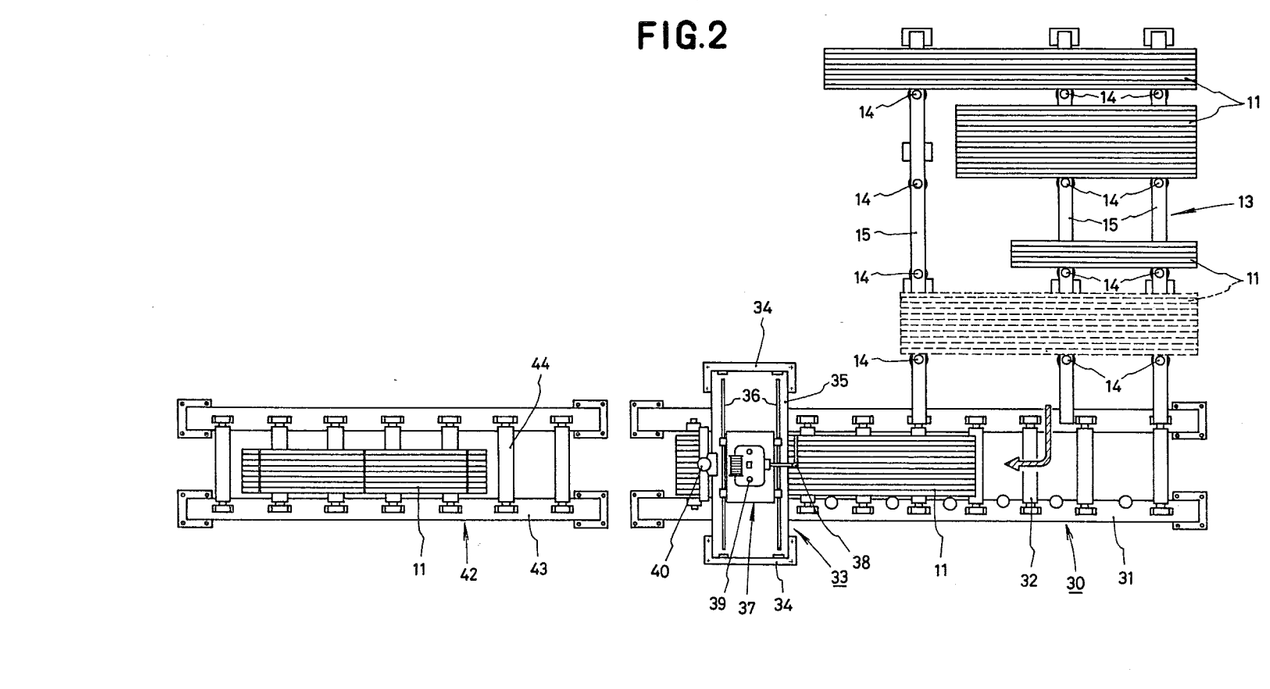
FIG. 2 is a plan view showing the bundling means for bundling the steel bars cut off and the banding means connected to the bundling means in the apparatus used for practising the present process.
Figures 3, 4:
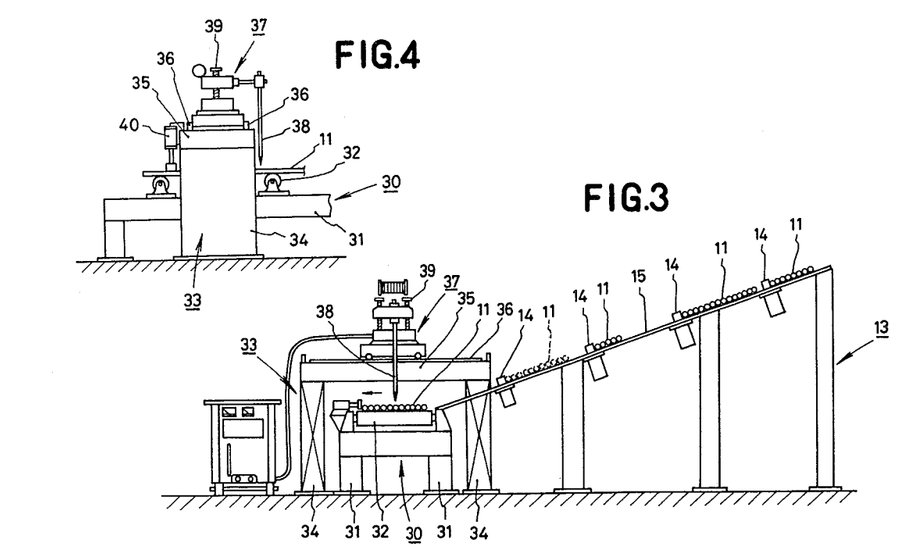
FIG. 3 is a front view of the apparatus of FIG. 2.
FIG. 4 is a side view of the banding means of the apparatus of FIG. 2.

FIGS. 2, 3 and 4 show an embodiment wherein the bundle of steel bars 11 is banded by welding. As illustrated in these drawings, a conveyor 30 is disposed at the lower portion of the stocker 13 in order to convey the bundle of steel bars 11 aligned flatly in their longitudinal direction. The conveyor 30 consists of support frame 31 and a number of conveyor rollers 32 arranged on the upper surface of the support frame. Welding means 33 is disposed beside the end portion of the conveyor 30. The welding means includes support poles 34 implanted on both sides of the conveyor 30 and an errection 35 provided so as to bridge over the conveyor 30 and fixed to the support poles 34. Two rails 36 are fixed onto the upper surface of the errection 35 and crosses transversely the conveying direction of the conveyor 30. A welding machine 37 is allowed to reciprocate on these rails 36. The tip position of a welding torch 38 of the welding machine 37 is vertically adjustable by means of a screw mechanism 39. Push means 40 for pushing the upper surface of the plural steel bars 11 arranged flatly is disposed at the front portion of the errection 35. A second conveyor 41 is connected to the end portion of the conveyor 30 in order to carry out the steel bars 11 that are bound together by welding. The second conveyor 42 likewise consists of support frames 43 and a number of conveyor rollers 44 arranged on their upper surface.

In the abovementioned banding means, the plural steel bars 11 that are transferred from the stocker 13 to the conveyor means 31 in the slat-like state are carried by the conveyor rollers 32 till the desired welding position becomes immediately below the welding torch 38, and then stop there. Next, after the push means 40 pushes and fixes the upper surface of the steel bars, 11, the tip of the welding torch 38 is adjusted by the screw mechanism 39 so that a suitable distance is maintained between it and the surface of the steel bars 11 in the slat-like posture. While the welding machine 37 is being moved on the rails 36, the tip of the welding torch 38 is transversely moved along the surface of the slat like steel bars 11 in their longitudinal direction, thereby welding the portions of the steel bars 11 adjacent each other. In this case, welding conditions such as the moving speed of the welding torch 38, the welding voltage, the welding current and the like are suitably selected to secure sufficient weld bond strength so that the plural steel bars 11 can maintain the slat-like posture during the bending work.

After the welding work is completed at the first welding position in the manner, the push means 40 are elevated and the conveyor rollers 32 are actuated to move the slat-like steel bars 11 to the subsequent welding position, followed thereafter by the repetition of the abovementioned welding procedures.

As the welding method, welding methods in the $CO_2$ gas atmosphere, plasma gas welding, resistance seam welding and the like may be selected suitably.

In comparison with the banding work using a wire or a band, the banding work by welding makes it possible to band a greater number of steel bars per pass and to drastically reduce the labor required. Since it has no wire or band which would otherwise hinder the subsequent bending work, the banding work by welding has also the advantage that the subsequent bending work can be carried out simply and easily.

Figure 5:
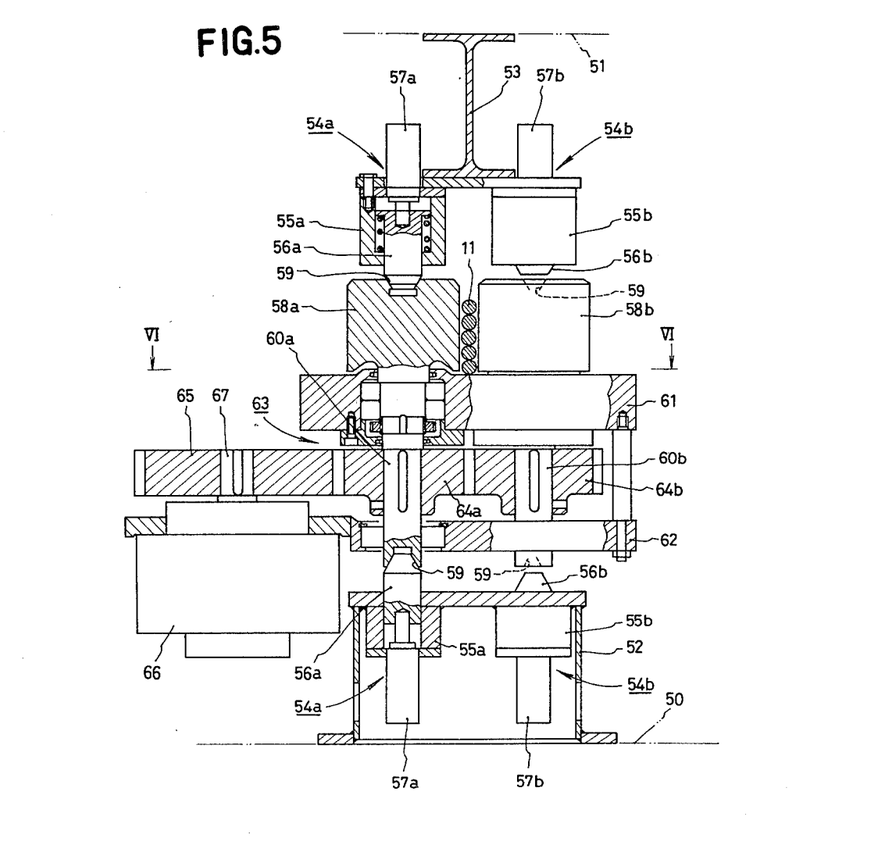
FIG. 5 is a partly sectional side view of the bend work means of the apparatus used for practising the present process.
Figure 6:
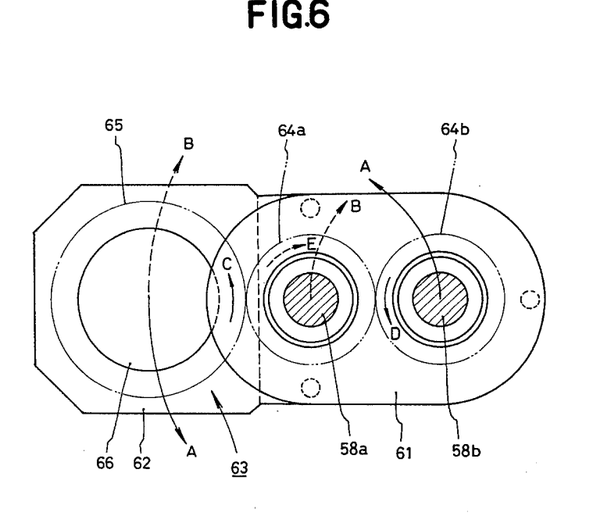
FIG. 6 is a plan view of the apparatus as viewed along line VI—VI in FIG. 5.
Figure 7:
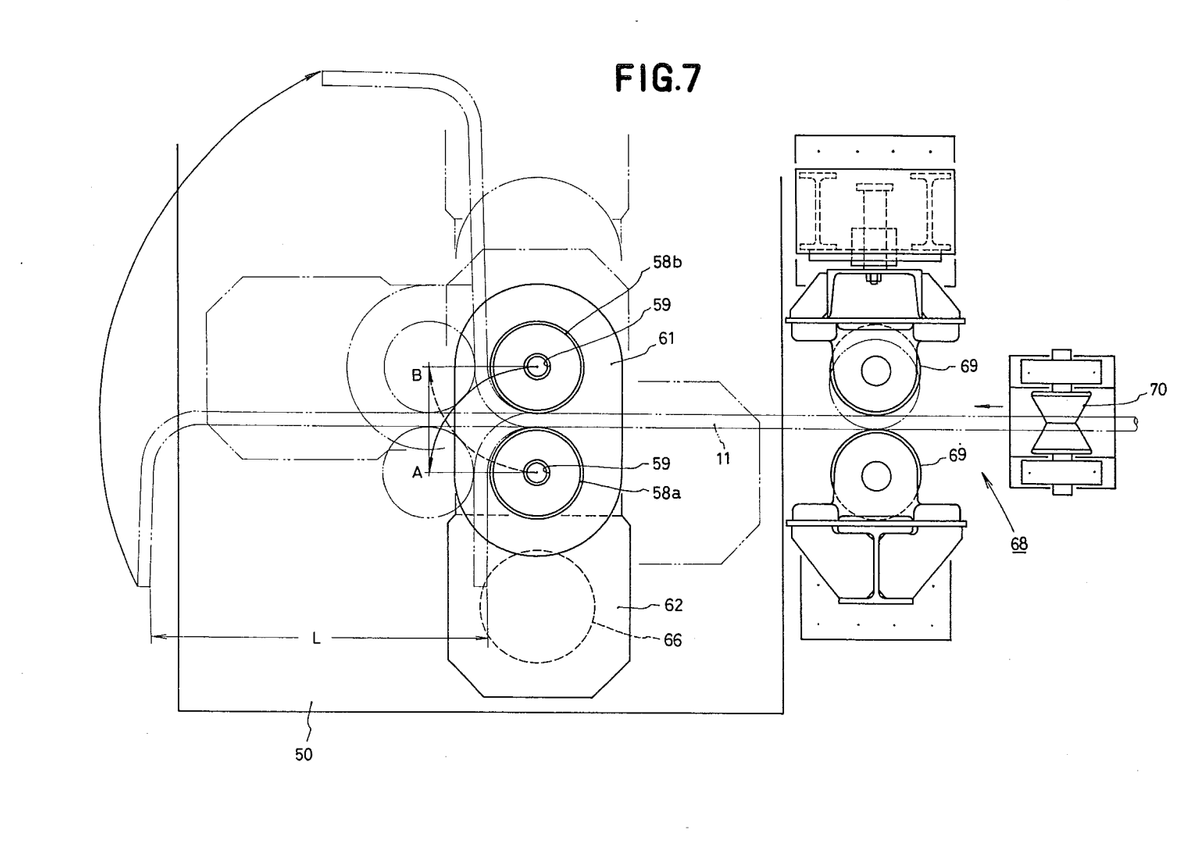
FIG. 7 is a plan view showing the operation condition of the apparatus of FIG. 5.

FIGS. 5, 6 and 7 show the bending machine.

In FIGS. 5 and 6, an underframe 52 is shown fixed onto a foundation 50 and a beam 53 is fixed to a stationary frame 51 above the underframe 52. The foundation 52 and the beam 53 are equipped with revolution-restriction mechanisms 54a and 54b, respectively, and are also furnished with bosses 55a and 55b, respectively. Center shafts 56a and 56b each having a tapered tip are retractively fitted into these bosses 56a, 56b, respectively, and are actuated by respective oil hydraulic rams 57a and 57b.

These revolution-restriction mechanisms 54a and 54b are arranged parallel to each other and a pair of rollers 58a, 58b are provided so that their axes are in conformity with those of the center shafts 56a and 56b.

Taper holes 59a and 59b are bored on the abovementioned pair of rollers 58a and 58b at the positions opposite the center shafts 56a and 56b and the center shaft of either one of the right and left revolution-restriction mechanisms 54a and 54b is fitted into the taper holes 59. While the rollers 58a and 58b maintain such a gap between them as to allow the passage of the steel bars 11 therethrough, they are pivotally supported up and down by two link plates 61 and 62 around roller shafts 60a and 60b. Between these link plates 61, 62 is interposed a planetary gear mechanism 63 which is constructed such that the abovementioned pair of rollers 58a and 58b function as a center roller and a revolving roller with respect to one another.

Gears 64a and 64b meshing each other are fixed to the shafts of the rollers 58a, 58b, respectively. One 64a of these gears 64a, 64b engages with a driving gear 65, which is fitted to an output shaft 67 of an oil pressure motor 66 fixed to the lower link plate 62.

According to the arrangement of each mechanism described above, the rollers 58a and 58b can be dismounted from the revolution-restriction mechanisms 54a and 54b together with the link plates 61, 62 and the planetary gear mechanisms 54a and 54b as an integral unit.

If a variety of rollers 58a, 58b of varying dimensions are provided beforehand, therefore, the gap between the center shafts 56a and 56b can be adjusted so that the rollers 58a and 58b can be easily replaced in accordance with a desired bending shape.

On the other hand, a feed mechanism 68 is disposed at the back of the rollers 58a and 58b as shown in FIG. 7 so as to transfer the steel bars to the bending machine. The feed mechanism 68 consists of a pair of conveyor rolls 69, 69 and guide rollers 70 disposed at the front portion whereby one of the conveyor rolls 69, 69 is movable in accordance with the diameter of the steel bars 11.

Next, the explanation will be made how the steel bars 11 are bent in the crank shape.

To bend the steel bar 11 in the direction of arrow in FIG. 7, for example, the center shaft 56a of the revolution-restriction mechanism 54a is fitted into, and brought into pressure contact with, the taper hole 59 of the roller 58a as shown in FIG. 5 by means of the urging force of the oil hydraulic ram 57a. While the roller 58a is thus fixed, the other roller 58b is left free.

In consequence, the steel bar 11 is bent by the free roller 58b, that is, the revolving roller, onto the fixed roller 58a, that is, the center roller, as if it is wound onto the latter, as shown in FIG. 7.

After the steel bar 11 is bent in the direction A in this manner, the oil pressure motor 66 is reversely rotated so that the free roller 58b is returned to its original position and the steel bar 11 is transferred by the distance L shown in FIG. 7 by the feed mechanism 68.

While the steel bar 11 is being transferred by the distance L, the center shaft 56b of the revolution-restriction mechanism 54b is fitted into, and brought into pressure contact with, the roller 58b and the center shaft 56a is separated from the roller 58a, thereby changing the center roller to the revolving roller.

Next, as the driving gear 65 of the oil pressure motor 66 is again rotated in the direction of arrow C as shown in FIG. 6, the gear 64a of the free roller 58a rolls over the gear 64b of the fixed roller 58b while rotating in the direction of dotted arrow E. Accordingly, the free roller 58a turns round on its axis in the direction of dotted arrow B as well as moves round and along therewith, the oil pressure motor 66 also revolves in the direction of the dotted arrow B.

As a result, the steel bar 11 shown in FIG. 7 is bent by the free roller 58a, that is, the revolving roller, as if it were wound onto the fixed roller 58b, that is, to the center roller.

After the procedures so far described are completed, the oil pressure motor 66 is reversely rotated whereby the free roller returns to its original position. When the steel bar 11 is fed out under this state by the feed mechanism 68, there can be obtained the steel bar 11 bent in the crank shape without reversing the steel bar 11.

Incidentially, the bending angle of the steel bar 11 can be optionally determined by controlling the angle of revolution of the oil pressure motor 66. It is also possible to use an electric motor or other actuators in place of the oil pressure motor 66.

As described in the foregoing paragraph, in shaping plural bends of varying bending directions on the steel bar, the present invention makes it possible to instantaneously shape the bends of varying bending directions without reversing the steel bar.

As a number of steel bars can be arranged in the slat-like form and simultaneously applied with plural bends having varying bending directions in accordance with the present invention, the production efficiency of the steel bars can be enhanced markedly.

In accordance with the present invention, further, since the endless steel bar is cut by the cutter while it is being fed by the feed means which intermittently controls the advance in a predetermined distance and stop of the steel bar, the waste of the blank due to the cutting work can be eliminated, and the cutting work can be carried out continuously.

In the present invention, after the steel bars are cut in a desired length, they are bundled and banded in the slat-like form and then bent in the desired shape so that the steel bars of the desired shape can altogether be subjected to the bending work. In comparison with the prior art, therefore, the bending work can be made far easily and the time required therefor can be reduced drastically.

Thus, the present invention makes it possible not only to produce the steel bars through a continuous operation but also to produce them on a mass basis.

The present invention is not, of course, limited to the above-described embodiments but may be modified in various ways within the scope of the appended claims.

What is claimed is:

1. A continuous working process of steel bars for reinforced concrete, comprising: feeding an endless steel bar material to a cutter by intermittently repeating the advance of said material in a predetermined distance and the stop thereof; cutting the endless steel bar thus fed by said cutter into steel bars having a predetermined length; firmly banding together the steel bars thus cut by a predetermined plural number into a laterally slat-like shaped bundle; and bending the bundle into a predetermined shape while retaining the lateral slat-shape.

2. The continuous working process of steel bars for reinforced concrete according to claim 1 wherein said endless steel bar material is provided by uncoiling an endless steel bar coiled on a magazine reel and straightening the same.

3. The continuous working process of steel bars for reinforced concrete according to claim 1 wherein said endless steel bar material is provided by joining end to end a plurality of straight steel bar material of a specified length to form them endless.

4. A continuous working process of steel bars for reinforced concrete, comprising: feeding an endless steel bar material to a cutter by intermittently repeating the advance of said material in a predetermined distance and the stop thereof; cutting the endless steel bar thus fed by said cutter into steel bars having a predetermined length; classifying the steel bars thus cut into those which require bending and those which do not; and firmly banding together the steel bars thus classified into respective groups by a predetermined number.

5. The continuous working process of steel bars for reinforced concrete according to claim 4 wherein said plural steel bars thus banded are formed in a slat-like shape and are further subjected to the bending work while keeping the slat shape.

6. The continuous working process of steel bars for reinforced concrete according to claim 4 wherein said plural steel bars banded together are formed in a round bar shape.

7. The continuous working process of steel bars for reinforced concrete according to any of claims 1 or 4, wherein markings are applied to said plural steel bars banded together.

8. The continuous working process of steel bars for reinforced concrete according to claim 1 which is carried out in accordance with a predetermined program.

* * * * *